United States Patent [19]

Kuboshima et al.

[11] Patent Number: 5,352,126
[45] Date of Patent: Oct. 4, 1994

[54] SHIELDED CONNECTOR

[75] Inventors: Hidehiko Kuboshima; Shigemi Hashizawa; Shigemitsu Inaba, all of Shizuoka, Japan

[73] Assignee: Yazaki Corporation, Tokyo, Japan

[21] Appl. No.: 149,916

[22] Filed: Nov. 10, 1993

[30] Foreign Application Priority Data

Nov. 11, 1992 [JP] Japan .................................. 4-300839
Aug. 31, 1993 [JP] Japan .................................. 5-216039

[51] Int. Cl.$^5$ .............................................. H01R 4/58
[52] U.S. Cl. .................................... 439/89; 439/587
[58] Field of Search .................... 439/88, 89, 92, 101, 439/607, 609, 610, 278, 281, 282, 279, 586, 587, 588, 589

[56] References Cited

U.S. PATENT DOCUMENTS

| 4,187,481 | 2/1980 | Boutrous ............................ 439/89 X |
| 4,674,807 | 6/1987 | Boteler et al. . |
| 4,802,867 | 2/1989 | Palmer ............................. 439/587 |
| 4,895,533 | 1/1990 | Yagi et al. ........................ 439/587 |
| 5,199,893 | 4/1993 | Fussell ........................... 439/587 X |

FOREIGN PATENT DOCUMENTS 63-127083 8/1988 Japan .
3-182071 8/1991 Japan .

*Primary Examiner*—Khiem Nguyen
*Attorney, Agent, or Firm*—Armstrong, Westerman, Hattori, McLeland & Naughton

[57] ABSTRACT

A watertight type shielded connector includes a housing assembly and a terminal assembly. The housing assembly includes a housing and a shield element molded integrally with the housing. The terminal assembly includes a resilient plug fitted over the sheath of a shielding wire. The shielding wire has a distal end thereof connected to a terminal. The terminal assembly also includes a conductor in electrical contact with the shielding material of the shielding wire. Upon inserting the terminal assembly into the housing assembly, the conductor electrically engages the shield element of the housing assembly so that the conductor establishes electric continuity between the shield element of the housing assembly and the shielding material of the terminal assembly while at the same time the plug fits to the fitting bore of the housing assembly so that the terminal assembly engages the housing assembly in a watertight relation. The shield element of the housing assembly serves to shield the terminal. The plug is formed with a first projection extending all around the outer surface of the plug to form a closed loop and a second projection extending all around the inner surface of the plug to form a closed loop, the first projection fitting to the fitting bore of the housing assembly and the second projection fitting over the sheath of the shielding wire. The plug and conductor may take the form of a single component made of a conductive rubber.

11 Claims, 6 Drawing Sheets

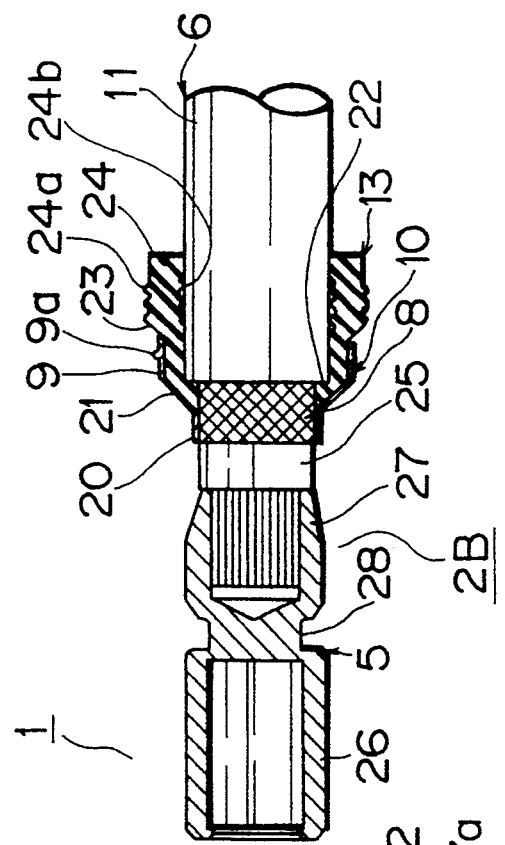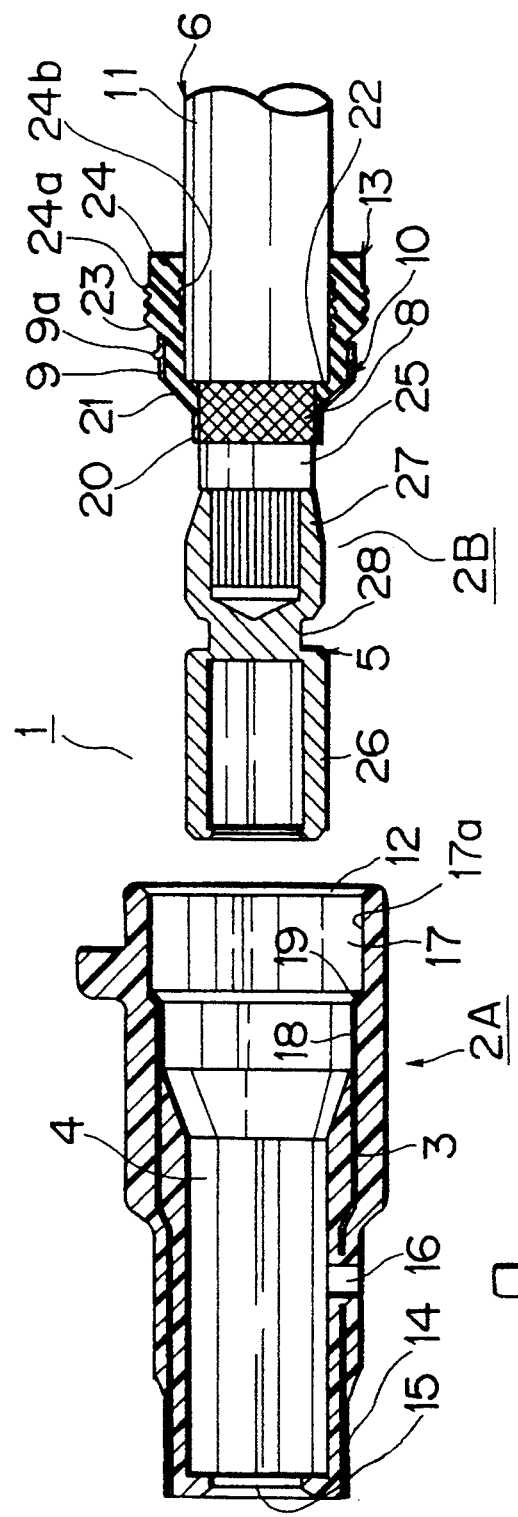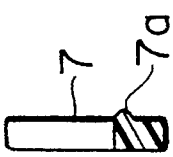

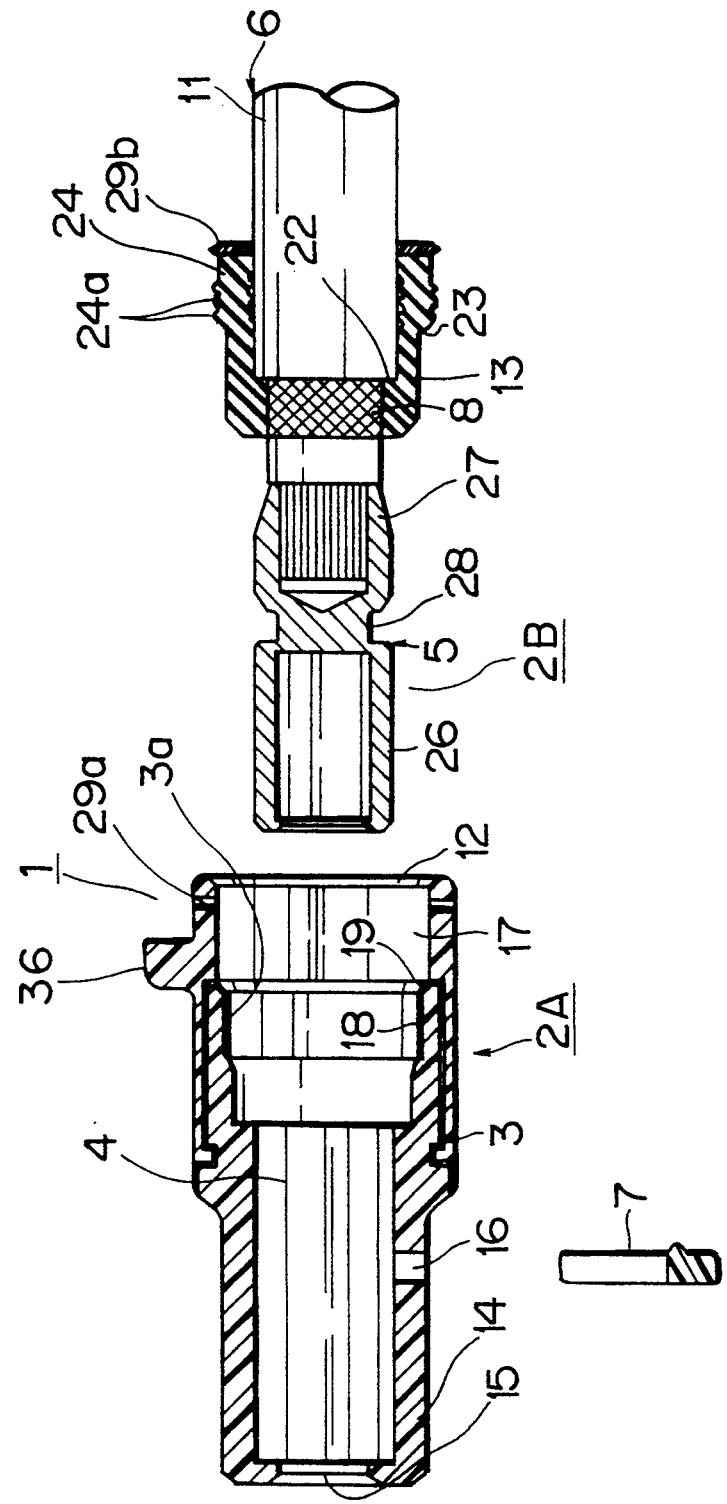

SHIELDED CONNECTOR

BACKGROUND OF THE INVENTION

1. Field of the Invention

The present invention relates to a shielded connector with a watertight construction.

2. Prior Art

FIG. 8 shows a conventional shielded connector disclosed in Japanese Utility Model Preliminary Publication No. 63-127083. A metal shield 42 is fitted into a housing 41 molded of synthetic resin to enclose terminals 44. A shielding wire 46 is securely crimped at a braided shield 47 to a crimp element 48 of the metal shield 42 and respective sheathed wires 45 extend therefrom into the housing 41. The sheathed wires 45 are crimped to the corresponding terminals 44 seated in cavities 43. Electrical noise is directed to the crimp element 48 and metal shield 42 and passed through the braided shield 47 and drain wires 49 to ground.

The aforementioned construction is disadvantageous in that the distance from the cavities 43 to the crimp element 48 should be long for easy pullout of the sheathed wires 45 from the cavities 43. This long distance results in large size of connector.

Further, the construction is not watertight at all. The metal shield 42 fitted into the housing 41 increases the number of parts, and the assembling the metal shield 42 into the housing 41 is rather time consuming.

FIG. 9 shows a prior art watertight shield connector, disclosed in Japanese Patent Preliminary Publication No. 3-182071. A rubber 55 is molded integrally with the end portion of a shielding wire 52 to cover a portion between the shield 52 and the tip end portion of a braided wire 51. The rubber 55 serves to prevent water from getting into the shielding wire 52.

The rubber 55 causes the braided wire 51 to be fat and less flexible, making it difficult to pull out the terminal 56. A portion 57 is not shielded at all. Additionally, molding the rubber 55 with the shielded wire 52 and braided wire 51 is time consuming.

SUMMARY OF THE INVENTION

An object of the invention is to provide a shielded connector having good electrical connection, good shielding effect at the connection, and less number of parts, and being watertight as well as easy to assemble.

A shielded connector comprises a housing assembly and a terminal assembly. The housing assembly includes a housing and a shield element molded integrally with the housing. The terminal assembly includes a plug fitted over the sheath of a shielding wire. The shielding wire has a distal end thereof connected to a terminal. The terminal assembly also includes a conductor in electrical contact with the braided shield of the shielding wire. Upon inserting the terminal assembly into the housing assembly, the conductor electrically engages the shield element of the housing assembly so that the conductor establishes electric continuity between the shield element of the housing assembly and the braided shield of the shielded wire while at the same time the plug fits to the inner wall of the housing so that the terminal assembly engages the housing assembly in a watertight relation.

The conductor has an outer projection formed all around an outer surface thereof to form a closed loop, the outer projection being in close contact with the shielding element when the terminal assembly is assembled into the housing assembly.

The plug is made of a resilient material and is formed with at least one outer projection extending all around an outer surface thereof to form a closed loop. The outer projection fits to the inner wall of the housing of the housing assembly. The plug is formed with at least one inner projection extending all around an inner surface thereof to form a closed loop. The inner projection fits over the sheath of the shielding wire.

A conductive rubber may be used in place of the plug and conductor. The conductive rubber is in contact with the braided shield of the shielding wire while also being in contact with the shield element of the housing assembly upon assembling the terminal assembly to the housing assembly.

BRIEF DESCRIPTION OF THE DRAWINGS

Features and other objects of the invention will become more apparent from the description of the preferred embodiments with reference to the drawings in which:

FIGS. 1A, 1B, 1C, 1D show a first embodiment of a shielded connector according to the present invention, FIG. 1A showing a housing assembly 2A, FIG. 1B showing a terminals assembly 2B, FIGS. 1C and 1D showing a metal contact 10;

FIGS. 5A–5B show a second embodiment of a shielded connector according to the present invention;

DETAILED DESCRIPTION OF THE PREFERRED EMBODIMENT

Construction

Figure 2:
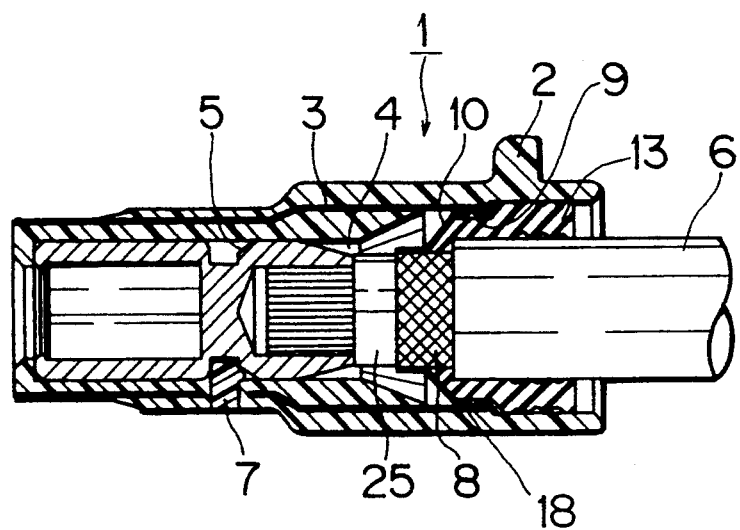
FIG. 2 shows the terminal assembly 2B of FIGS. 1A–1B inserted into the housing 2A until the cylinder 26 abuts the inner wall that closes the hole 15 half way.

A first embodiment of the invention will be described with reference to FIGS. 1A–4.

A shield connector 1 includes a terminal assembly 2B and a substantially cylindrical housing assembly 2A made of synthetic resin. The housing assembly 2A has a metal shield 3 of a generally hollow cylindrical shape, molded integrally within the wall of the housing assembly, The metal shield 3 is exposed at a large diameter portion 18 to the bore of the housing assembly and at a smaller diameter portion 14 thereof to the outside of the housing assembly 2A. The larger diameter portion serves as a first contact 18 and the smaller diameter portion as a second contact 14. The housing assembly is formed with a hole 16 therein through which a locking piece 7 is inserted in a press fit manner into a step 28 of the terminals 5 after the terminal assembly 2B is fitted into the housing assembly 2A. The locking piece 7 is U-shaped and holds the constriction 28 between two arms thereof when inserted into the housing assembly 2A. The housing assembly has an opening 15 at a front end thereof and a fitting bore 17 having a diameter larger than the opening 15 at a rear end thereof. The fitting bore 17 has a short conical surface 12 at an opening end thereof.

The terminal assembly 2B has a terminal 5 with a pin-receiving cylinder 26 of a hollow cylindrical shape, and a wire-crimping portion 27 that is crimped to a bundle of wires. The terminal 5 has a constriction 28 between the pin-receiving cylinder 26 and the wire-crimping portion 27. A conductor 10 is of a generally pipe-like shape and has a cylindrical crimp portion 20 of a small diameter, a short truncated cone 21, and a cylindrical contact 9 of a larger diameter, all of which being integrally continuous. The conductor 10 is securely crimped at 20 to a braided shield 8. The truncated cone 21 and cylindrical contact 9 securely fits over a resilient plug 13. The plug 13 is made of, for example, silicone rubber and NBR. The cylindrical contact 9 has an annular projection 9a therearound in the middle of an outer surface thereof as shown in FIG. 1C, or discrete projections therearound. The cylinder contact 9 may have discrete projections 9b with slits 9b provided on each side of the projections 9b as shown in FIG. 1D. The cylindrical contact 9 is always urged outwardly of the shielded wine 6 by the resiliency of the cylindrical plug 13. The plug 13 is formed with a stepped portion 22 on a bore thereof and a conical outer surface 23. The stepped portion 22 resiliently abuts a longitudinal tip end of a sheath 11 of the shielding wire 6 while the conical surface 23 resiliently abuts the inner surface of the truncated cone 21. The plug 13 is formed with outer lips 24a on the outer surface thereof and inner lips 24b on the inner surface thereof. The inner lips 24b fits over the sheath 11 in a watertight relation. The outer lips 24a closely fits into a fitting bore 17 of the housing assembly 2A in a watertight relation when the terminal assembly 2B is fully fitted into the housing assembly 2A. The lips 24a and 24b are advantageously formed to ensure watertight effect of the plug 13.

As shown in FIG. 2, the terminal assembly 2B is inserted into the housing assembly 2A until the cylinder 26 abuts the inner wall that closes the hole 15 half way. The short conical inner surface 19 of the housing assembly 2A facilitates the insertion of the terminal assembly 2B into the housing assembly so that the contact 19 is in resilient contact with the first contact 18. Upon inserting the terminal assembly 2B fully into the housing assembly 2A, the annular projection 9a on the cylindrical contact 9 contacts the first contact 18 in a closely sliding relation so that good electrical continuity is established between the braided shield wire (braided shielding) 8 and metal shield 3 through the conductor 10. The short conical inner surface 19 abuts the conical outer surface 23, preventing the terminal assembly 2B from advancing further into the housing assembly. Since the plug 13 is resiliently urges the contact 9 outwardly, the contact 9 is in resilient contact with the first contact 18. The outer lips 24a of the plug 13 closely fit into the fitting bore 17 when inserted into the housing assembly 2A, thereby preventing water from getting in. Once the terminal assembly 2B has been fully inserted into the housing assembly 2A, the locking piece 7 is inserted into the housing assembly through the hole 16 so that the terminal 5 is locked. The terminal 5 can easily be pulled out by first disassembling the looking piece 7 from the housing assembly 2A and then pulling the shielding wire 6 out of the housing assembly 2A. The short sheathed wire 25 will not place any limitation on the disassembling operation of the sheathed wire from the housing assembly 2A since the contact 9 straightly and simply moves out of engagement with the contact 18. This is true of a case where a plurality of sheathed wires 25 are assembled in a single shielded connector.

Figure 3:
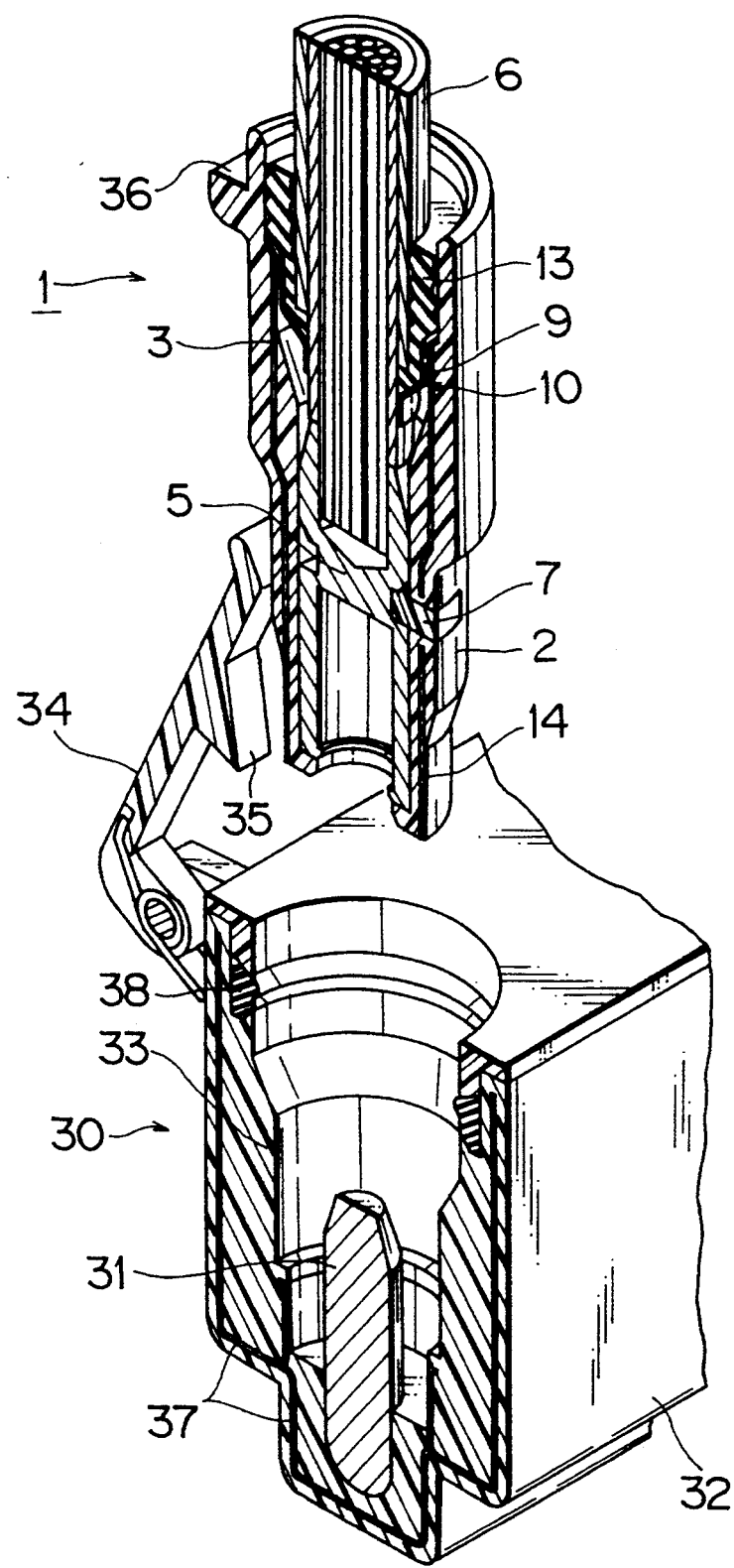
FIG. 3 is a cross-sectional view of the shielded connector 1 and a mating connector 30 before the shielded connector 1 is inserted into the mating connector 30.

FIG. 3 shows the shielded connector 1 it is inserted into a mating connector 30. The connector 30 has a pin terminals 31 projecting upwardly into a fitting space 33, and a metal shield 37 integrally molded with a housing 32. When assembling the shielded connector 1 into the connector 30, the pin terminal 31 advances into the pin-receiving cylinder 26 of the terminals 5, thereby making electrical contact with each other.

Figure 4:
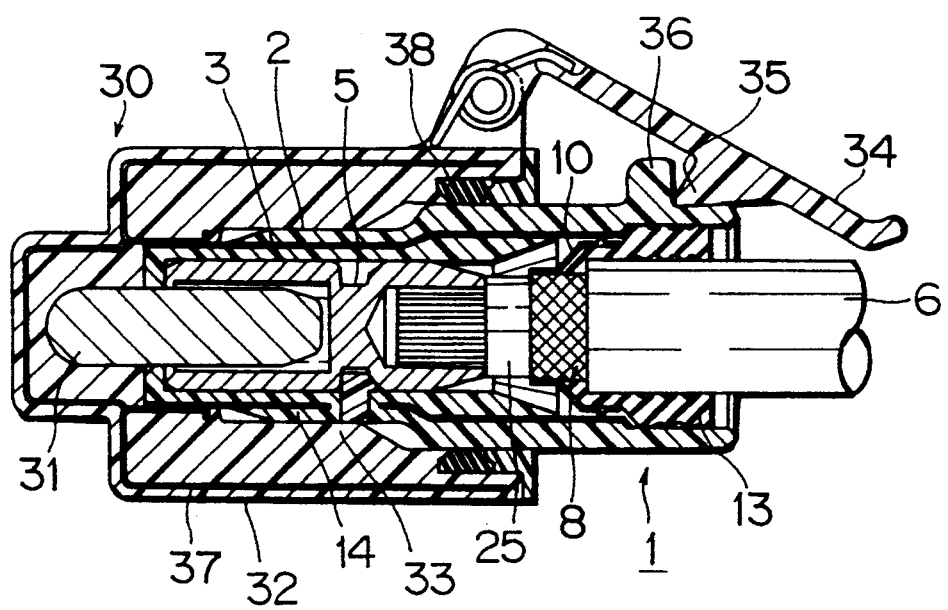
FIG. 4 shows the terminal assembly 2B fully inserted into the connector 30 and locked with the connector 30 by means of the latch 35.

Once the terminal assembly 2B is fully inserted into the housing assembly 2A as shown in FIG. 4, the second contact 14 of the terminal assembly 1 is in close contact engagement with an inner surface of the metal shield 37, so that the pin 5 and pin 31 are completely enclosed by a shielding material. The cylinder 40 closely fits into an annular packing 38 of the connector 30 so that the connection is watertight. Then a latch 35 of an pivotal arm 34 is fastened on a projection 36 to lock the shield connector 1 with the housing 32.

FIGS. 5A–5B illustrate a shielded connector of a second embodiment, FIG. 5A showing a housing assembly 2A of a second embodiment and FIG. 5B a terminal assembly 2B.

Figure 6:
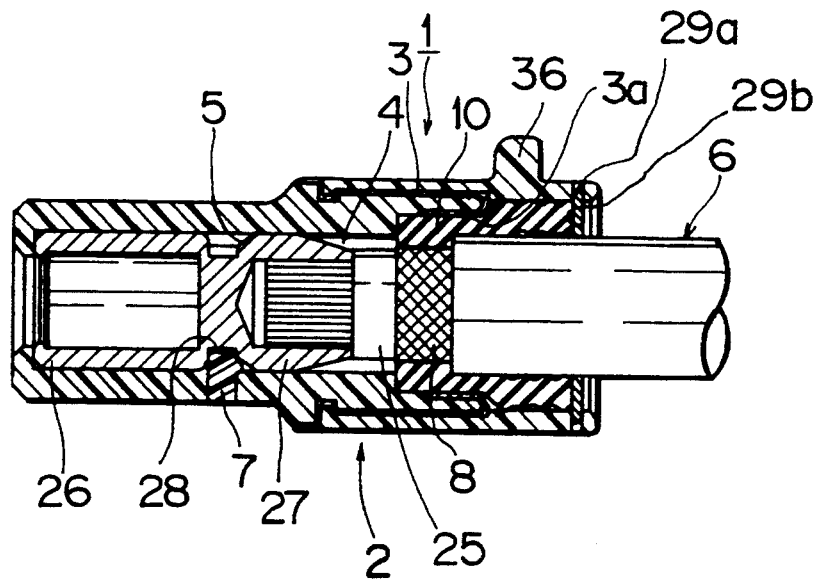
FIG. 6 shows the terminal assembly 2B of FIG. 5B inserted into the housing 2A of FIG. 5A until the cylinder 26 abuts the inner wall that closes the hole 15 half way.
Figure 7:
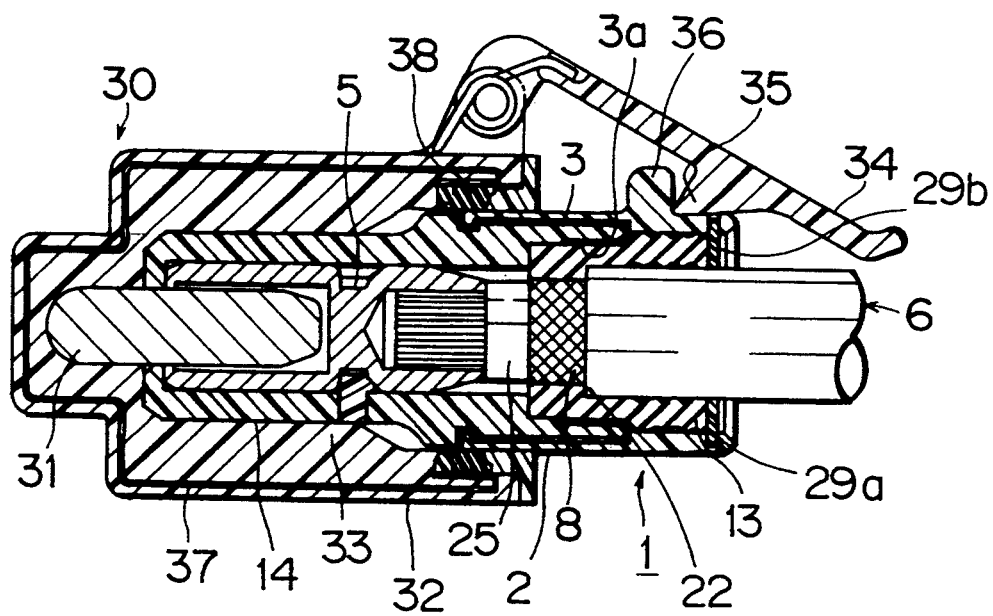
FIG. 7 shows the shielded connector 1 of FIG. 6 inserted into and locked to the mating connector 30.
Figure 8:
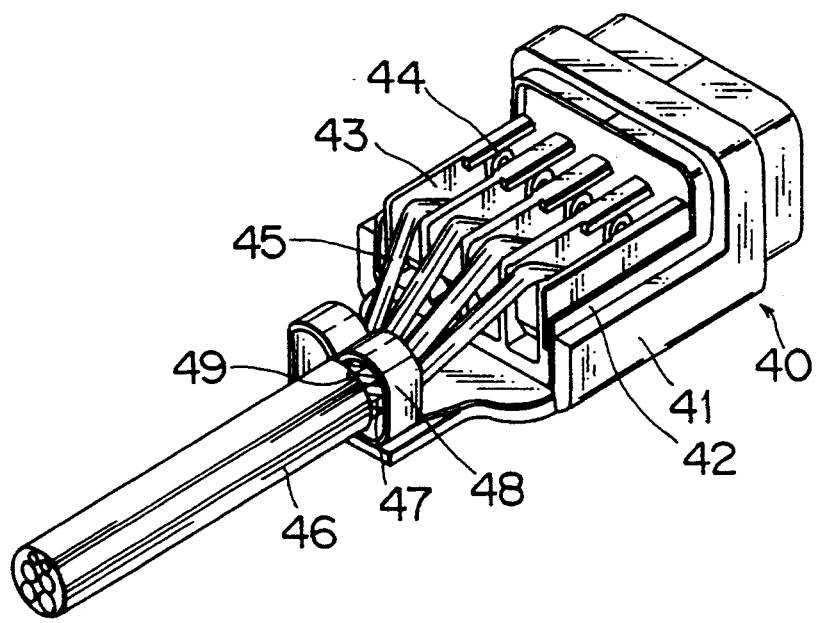
FIG. 8 shows a conventional shielded connector disclosed in Japanese Utility Model Preliminary Publication No. 63-127083.
Figure 9:
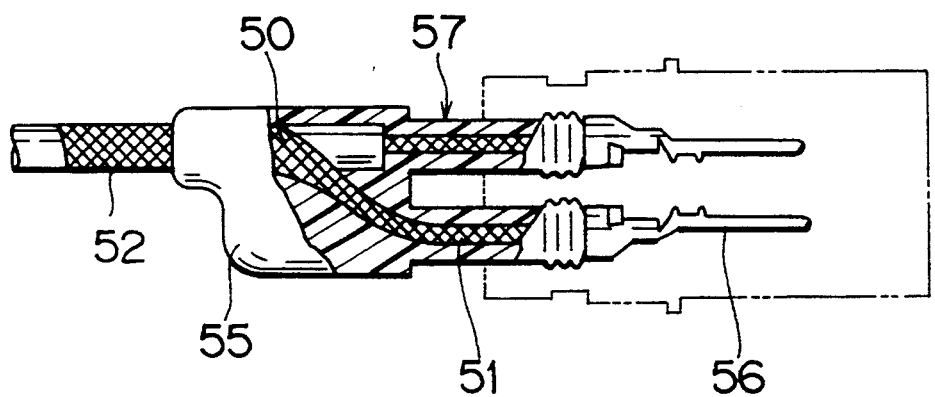
FIG. 9 shows a prior art watertight construction shielded connector, disclosed in Japanese Patent Preliminary Publication No. 3-182071.

A plug 23 is made of an electrically conductive rubber. metal shield 3 is inwardly folded over at 3a into a housing assembly 2A, so that the plug 23 is in a close contact with a first contact 18 when the terminal assembly 2B is inserted into the housing assembly 2A. An inner wall of a large diameter fitting bore 17 is formed with a plurality of holes 29a therein into which tip end portions of a fastener 29b fit, thereby preventing dropout of the terminal assembly 2B from the housing assembly 2A. FIG. 6 shows the terminal assembly 2B assembled into the housing assembly 2A to complete a shielded connector 1. FIG. 7 shows the shielded connector 1 inserted into and looked to housing 32 of a mating connector 30. The annular packing 38 is made of electrically conductive rubber and is fitted between the metal shield 37 and the metal shield 3 so that the terminal 51 and terminal 5 are completely enclosed by shielding material when the connector 1 is assembled into the connector.

What is claimed is:
1. A shielded connector comprising:
a housing assembly having a housing and a first shield element molded integrally with said housing;
a terminal assembly including a plug fitted over a sheath of a shielding wire having a distal end thereof connected to a terminal, and a conductor in electrical contact with a second shield element of the shielding wire, wherein upon inserting said terminal assembly into said housing assembly, said conductor electrically engages said first shield element so that said conductor establishes electric continuity between said first shield element and said second shield element, and said plug fits to an inner wall of the housing so that said terminal assembly engages said housing assembly in a watertight relation.

2. The shielded connector according to claim 1, wherein said plug is made of a resilient material.

3. The shielded connector according to claim 2, wherein said plug is formed with at least one first projection extending all around an outer surface thereof to form a closed loop and at least one second projection extending all around an inner surface thereof to form a closed loop, said first projection fitting to the inner wall of the housing of said housing assembly and said second projection fitting over the sheath of the shielding wire.

4. The shielded connector according to claim 3, wherein said conductor is of generally a pipe-like shape and fits over part of said plug.

5. The shielded connector according to claim 4, wherein said conductor has a third projection formed all around an outer surface of thereof to form a closed loop, said third projection being in close contact with said shielding element when said terminal assembly is assembled into said housing assembly.

6. The shielded connector according to claim 1, wherein said conductor is made of a metal.

7. The shielded connector according to claim 1, wherein said plug and said conductor are in a form of a conductive rubber, said conductive rubber being in contact with said second shield element of the shielding wire, and said conductive rubber being in contact with said first shield element of said housing assembly.

8. The shielded connector according to claim 1, wherein said housing assembly has a first stepped portion within the housing and said plug has a second stepped portion, said first stepped portion abuts said second stepped portion when said terminal assembly is fully inserted into said housing assembly, thereby preventing a further insertion of said terminal assembly into said housing assembly.

9. The shielded connector according to claim 1, wherein said housing is made of a synthetic resin.

10. The shielded connector according to claim 1 further including a mating connector into which said housing assembly having said terminal assembly assembled thereinto is inserted, said mating connector has a packing which seats between said housing assembly and said mating connector when said housing assembly is assembled into said mating connector, thereby said housing assembly and said mating connector being connected together in a watertight relation.

11. The shielded connector according to claim 1, wherein said housing assembly has a fourth projection on an outer surface thereof and said mating connector has a latching arm for engaging said fourth projection to lock said housing assembly with said mating connector.

* * * * *